May 1, 1934.  A. C. ROWLEY  1,957,357
INDICATOR FOR DRY PIPE SPRINKLER SYSTEMS
Filed April 13, 1933
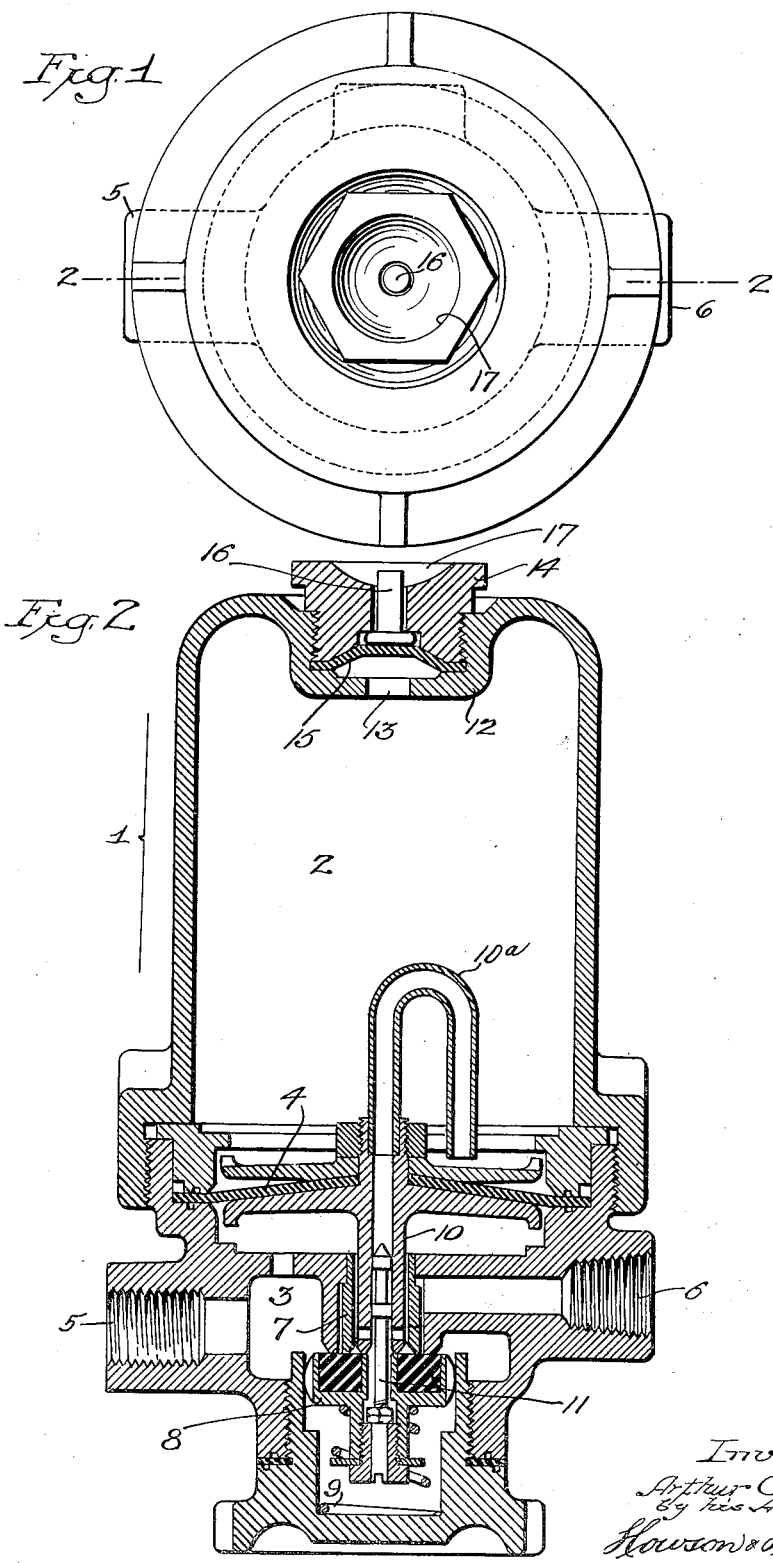

Patented May 1, 1934

1,957,357

UNITED STATES PATENT OFFICE 1,957,357

INDICATOR FOR DRY PIPE SPRINKLER SYSTEMS

Arthur C. Rowley, Drexel Hill, Pa., assignor to Globe Automatic Sprinkler Company, Philadelphia, Pa., a corporation of Pennsylvania Application April 13, 1933, Serial No. 666,043

1 Claim. (Cl. 116—114)

The principal object of this invention is to provide a novel indicator for fire-extinguishing systems of the dry pipe sprinkler and other types wherein fluid pressure is employed for maintaining the system in a balanced or static condition.

Another object of the invention is to provide an indicator of the stated character which shall be extremely simple in form, highly sensitive in operation, and fool-proof and which shall be capable of indicating the condition of the system or of any particular part thereof either visually or, where the device is located in a hidden or invisible position, through the sense of touch.

In the attached drawing:

Figure 1 is a plan view of an accelerating device for dry pipe sprinkling systems provided with an indicator made in accordance with my invention, and Fig. 2 is a section on the line 2—2, Fig. 1.

As illustrated in the drawing, the accelerating device comprises a casing 1, the interior of which is divided into upper and lower chambers 2 and 3 by means of a flexible partition 4. Access to the lower chamber from the exterior of the casing is provided by a port entering through a boss 5, see Fig. 2, and this chamber is also provided with an exhaust port 6. The exhaust port 6 in the present instance communicates at its inner end with an annular space 7, the upper end of which is closed, and the lower end of this space, which communicates with the chamber 3, is also normally closed by means of a valve 8 which is retractibly maintained in the elevated or seated position by means of a spring 9 in the bottom of the chamber 3.

The partition 4 comprises a depending hollow stem 10 and an upwardly extending hollow gooseneck 10a, through which stem and gooseneck communication is provided between the chambers 2 and 3, and this connecting passage is restricted by means of a stem 11 projecting upwardly from the valve 8 into the lower end of the stem 10.

Assuming now that the inlet port 5 is connected with a dry pipe system of automatic sprinklers, it will be apparent that the air pressure within the system will be impressed not only upon the chamber 3 but also through the restricted connection upon the chamber 2. While the pressures in the two chambers are balanced, the parts remain in their relative positions shown in Fig. 2, wherein the valve 8 functions to close the exhaust port 6. When the pressure in the chamber 3 is reduced by the opening, for example, of one of the sprinklers of the system, the resultant preponderant pressure in the chamber 2 forces the diaphragm 4 downwardly, and through the depending stem 10 unseats the valve 8 so that the chamber 3 is connected through the space 7 with the discharge port 6. Air is thus quickly evacuated from the system and the opening of the dry pipe valve correspondingly accelerated.

In accordance with the present invention, I provide at the top of the casing 1 a recessed portion 12 having a port 13 in the base communicating with the chamber 2. The sides of the recess 12 are threaded in the present instance for reception of a screw plug 14 which constitutes a clamp confining between itself and the bottom of the casing recess the peripheral edge portion of a flexible diaphragm 15. This diaphragm in effect closes the port 13 and prevents escape of pressure from the chamber 2. The plug 14 is centrally apertured for reception of a plunger 16 having at its lower end a head portion engaged by the diaphragm 15 and preventing displacement of the plunger 16 from the plug 14. The plunger 16 is of such length that when elevated, as shown in Fig. 2, the upper end thereof projects into a recess 17 in the top of the plug. Normally the plunger 16 will be maintained in the elevated position by the diaphragm 15, which is extended upwardly by the pressure within the chamber 2. If for any reason the pressure in the chamber 2 is exhausted, the diaphragm 15 will move downwardly and permit the plunger 16 to assume a position wherein the upper end thereof lies below the surface of the recess 17. The appearance, therefore, of the top of the plunger 16 within the recess 17 is an indication that pressure conditions exist within the dry pipe system and disappearance of the projecting end of the plunger is an indication that the system is not in its proper condition.

Accelerating devices of this character are frequently necessarily placed in inaccessible positions or in dark corners where a visible indicator is of little value. It will be apparent that the present device is capable of fulfilling its function entirely through the sense of touch, since a finger inserted in the recess 17 will immediately give the information sought as to the condition of the sprinkler system. This device is also of use where the accelerator is located in an elevated position wherein while available to the reach, it cannot readily be inspected.

It will be understood that I do not desire to limit myself to the particular application of my invention herein illustrated, and that there may be modification in the detail form of the device without departure from the invention.

I claim:

In fire-extinguishing apparatus, a hollow casing having a threaded depression, and a port at the bottom of said depression, a screw plug threaded into said depression, and a flexible diaphragm clamped at its peripheral edge portion in the bottom of said recess by the plug, the inner end of said plug being formed to permit distention of said diaphragm by fluid pressure within the casing and having an opening therein for reception of a plunger, the inner end of said plunger contacting the diaphragm and being supported by the latter when distended by fluid pressure within the casing in an advanced position in which it projects beyond an outer surface of said plug, said plunger when the diaphragm is not distended occupying a retracted position within the plug and thereby constituting means for indicating the presence or absence of fluid pressure within the casing.

ARTHUR C. ROWLEY.